(12) United States Patent
Lienkamp

(10) Patent No.: US 7,524,571 B2
(45) Date of Patent: Apr. 28, 2009

(54) METHOD FOR CONTROLLING NITROGEN FRACTION IN A FUEL CELL

(76) Inventor: Sebastian Lienkamp, 8 Am Hundacker, Budenheim (DE) 55257

( * ) Notice: Subject to any disclaimer, the term of this patent is extended or adjusted under 35 U.S.C. 154(b) by 498 days.

(21) Appl. No.: 10/952,200

(22) Filed: Sep. 28, 2004

(65) Prior Publication Data

US 2006/0068243 A1    Mar. 30, 2006

(51) Int. Cl.
*H01M 8/00* (2006.01)
*H01M 8/04* (2006.01)

(52) U.S. Cl. ............................. 429/13; 429/22; 429/23

(58) Field of Classification Search ................... 429/13, 429/22, 23; 700/271, 298, 281; 702/64, 702/65
See application file for complete search history.

(56) References Cited

U.S. PATENT DOCUMENTS

| 2003/0022042 | A1 | 1/2003 | Wells et al. | |
|---|---|---|---|---|
| 2004/0033399 | A1* | 2/2004 | Imamura et al. | 429/23 |
| 2004/0121204 | A1 | 6/2004 | Adelman et al. | |
| 2005/0003257 | A1* | 1/2005 | Willimowski et al. | 429/34 |

FOREIGN PATENT DOCUMENTS

| DE | 103 04 657 A1 | 9/2003 |
|---|---|---|
| DE | 10 2004 008 703 A1 | 9/2004 |
| DE | 10 2004 031 162 A1 | 1/2005 |
| WO | WO 2004/049489 A2 | 6/2004 |

* cited by examiner

*Primary Examiner*—Raymond Alejandro
(74) *Attorney, Agent, or Firm*—Harness, Dickey & Pierce, P.L.C.

(57) ABSTRACT

A correlation between a variance in a voltage output of fuel cell(s) of a fuel cell stack and a level of nitrogen in the anode side of the fuel cell stack provides an indirect indication of the nitrogen level in the anode side. Base on this correlation, the variance in voltage output can be used to determine an anode effluent venting requirement to avoid nitrogen fouling of the fuel cell stack.

22 Claims, 2 Drawing Sheets

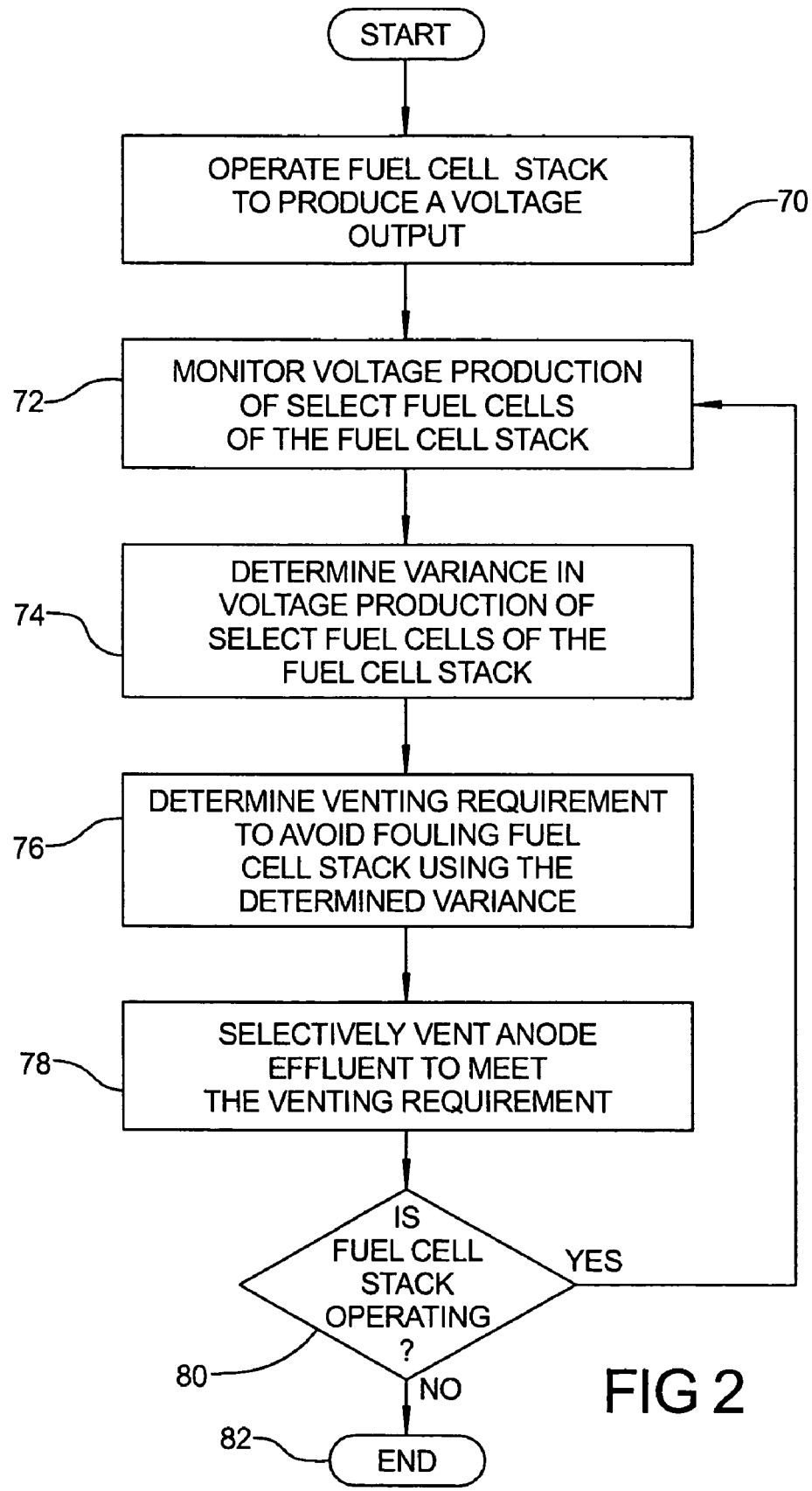

METHOD FOR CONTROLLING NITROGEN FRACTION IN A FUEL CELL

FIELD OF THE INVENTION

The present invention relates to operation of fuel cell systems and, more particularly to controlling the nitrogen fraction in a fuel cell stack.

BACKGROUND OF THE INVENTION $H_2$—$O_2$(air) fuel cells are well known in the art and have been proposed as a power source for many applications. There are several types of $H_2$—$O_2$ fuel cells including acid-type, alkaline-type, molten-carbonate-type, and solid-oxide-type. So called PEM (proton exchange membrane) fuel cells (a.k.a. SPE (solid polymer electrolyte) fuel cells) are of the acid-type, potentially have high power and low weight, and accordingly are desirable for mobile applications (e.g., electric vehicles). PEM fuel cells are well known in the art, and include a "membrane electrode assembly" (a.k.a. MEA) comprising a thin, proton transmissive, solid polymer membrane-electrolyte having an anode on one of its faces and a cathode on the opposite face. The MEA is sandwiched between a pair of electrically conductive elements which (1) serve as current collectors for the anode and cathode, and (2) contain appropriate channels and/or openings therein for distributing the fuel cell's gaseous reactants over the surfaces of the respective anode and cathode catalysts. A plurality of individual cells are commonly bundled together to form a PEM fuel cell stack.

In PEM fuel cells hydrogen is the anode reactant (i.e., fuel) and oxygen is the cathode reactant (i.e., oxidant). The oxygen can either be in a pure form (i.e., $O_2$), or air (i.e., $O_2$ mixed with $N_2$). The solid polymer electrolytes are typically made from ion exchange resins such as perfluoronated sulfonic acid. The anode/cathode typically comprise finely divided catalytic particles (often supported on carbon particles) admixed with proton conductive resin.

When air is used as the cathode reactant, nitrogen within the cathode side of the fuel cell stack permeates into the anode side of the fuel cell stack across the membrane separating the anode and cathode flow fields. The nitrogen interferes with reaction of the hydrogen by decreasing the hydrogen partial pressure. As the nitrogen concentration increases in the anode side of the fuel cell stack, voltage production of the fuel cell stack will decrease. The decrease in voltage production can be localized to specific fuel cells or can exist throughout all the fuel cells. If the nitrogen concentration gets to high, the fuel cell stack can become fouled by the nitrogen thereby starving the reaction and resulting in unstable voltage production. It is therefore advantageous to prevent nitrogen fouling of the fuel cell stack.

To prevent nitrogen fouling of the fuel cell stack, the nitrogen can be vented from the anode side along with anode effluent, which contains unused hydrogen. The venting of unused hydrogen, however, reduces the efficiency of the fuel cell stack and limits the operating range of the fuel cell stack for a given quantity of stored hydrogen. Thus, the need for removing nitrogen from the anode side and the desire to avoid venting unused hydrogen must be balanced. Accordingly, it would be advantageous to provide a control scheme wherein the necessity of venting nitrogen from the anode side is balanced against the desire to provide efficient operation of the fuel cell stack and an acceptable operating range. It would further be advantageous if such a control scheme avoided the use of costly dedicated sensors or similar devices to determine and/or monitor the nitrogen concentration in the anode side. Moreover, it would be advantageous if such a control scheme utilized existing hardware present in the fuel cell system.

SUMMARY OF THE INVENTION

The inventor has discovered that a correlation exists between a variance in the voltage output of the fuel cell(s) of the fuel cell stack and a level of nitrogen in the anode side of the fuel cell stack. The correlation provides an indirect indication of the nitrogen level in the anode side. The correlation can take into account the sensitivity of a particular fuel cell stack to nitrogen fouling. Based on this correlation, the variance in voltage output can be used to determine the anode effluent venting requirements and balanced against the desire for efficient operation of the fuel cell stack and for an acceptable operating range.

A method of operating a fuel cell system having at least one fuel cell stack with an anode flow path having a bleed device downstream of an active area of the fuel cell stack is disclosed. The method includes: (1) operating the fuel cell stack to produce a voltage output; (2) determining a variance in a voltage output of at least one fuel cell of the fuel cell stack; and (3) venting anode effluent from the anode flow path based upon a correlation between the variance and nitrogen fouling of the at least one fuel cell of the fuel cell stack.

In another aspect of the present invention, a method of operating a fuel cell stack to avoid nitrogen fouling is disclosed. The method includes: (1) operating the fuel cell stack to produce a voltage output; (2) determining a variance in a voltage output of a plurality of fuel cells of the fuel cell stack during operation of the fuel cell stack; (3) determining a venting requirement for the fuel cell stack to avoid nitrogen fouling of the fuel cell stack based upon a correlation between said variance and nitrogen fouling of the fuel cell stack; and (4) selectively venting anode effluent from the fuel cell stack to meet the determined venting requirement.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a simplified flow chart illustrating the method for controlling the nitrogen fraction in the anode side of a fuel cell stack according to the principles of the present invention.

DETAILED DESCRIPTION OF THE PREFERRED EMBODIMENTS

Figure 1:
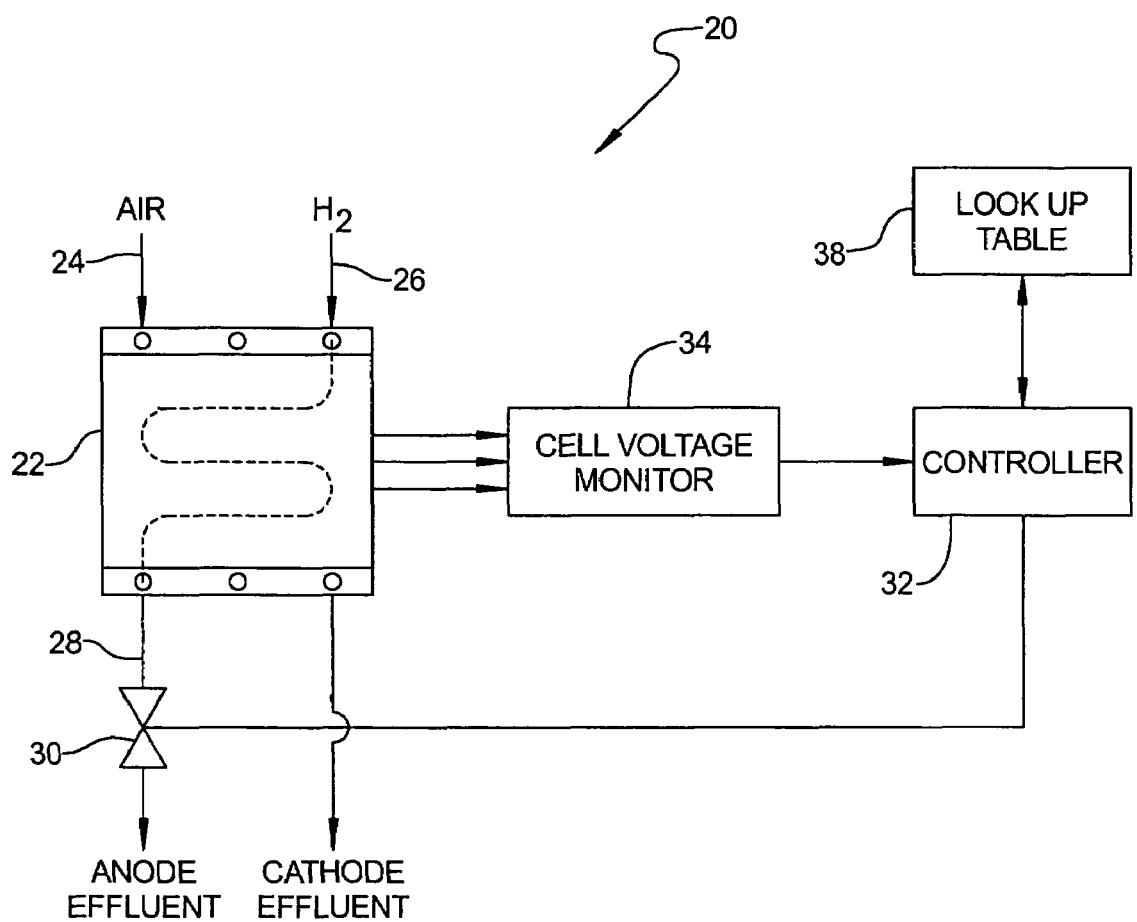
FIG. 1 is a schematic representation of a fuel cell system according to the principles of the present invention.

The following description of the preferred embodiment(s) is merely exemplary in nature and is in no way intended to limit the invention, its application, or uses. As used herein, the term module refers to an application specific integrated circuit (ASIC), an electronic circuit, a processor (shared, dedicated or a group) and memory that execute one or more software or firmware programs, a combinational logic circuit, or other suitable components that provide the described functionality.

Referring now to FIG. 1, a schematic representation of a fuel cell system 20 according to the principles of the present invention is represented. Fuel cell system 20 includes a fuel cell stack 22 comprised of a plurality of fuel cells arranged relative to one another in a stacked configuration. Each fuel cell has an anode side and a cathode side for receiving respective hydrogen-containing anode reactant and oxygen-containing cathode reactant. Fuel cell stack 22 is operable to convert the anode and cathode reactants into electricity, a hydrogen-containing anode effluent and an oxygen-containing cathode effluent.

An oxygen-containing cathode reactant stream 24 can be provided to fuel cell stack 22 from a variety of sources. The sources include, but are not limited to, air supplied from a storage device and air drawn from the environment within which fuel cell system 20 is employed. The air supplied to fuel cell stack 22 contains oxygen along with nitrogen. A portion of the nitrogen within the cathode side of fuel cell stack 22 may permeate to the anode side through the membrane separating the anode and cathode flow fields. The supplying of the cathode reactant stream 24 to fuel cell stack 22 and the venting of cathode effluent produced in fuel cell stack 22 will not be discussed in detail. It should be understood that cathode reactant will be supplied to fuel cell stack 22 in a quantity sufficient to meet the operational demands placed on fuel cell system 20 and that cathode effluent will be removed from fuel cell stack 22 as needed.

A hydrogen-containing anode reactant stream 26 can be provided to fuel cell stack 22 from a variety of sources. Such sources include, but are not limited to, a reformate stream from a reformer and hydrogen from a hydrogen storage device. The supplying of anode reactant stream 26 to fuel cell stack 22 will not be discussed in detail. It should be understood that anode reactant stream 26 will be supplied to fuel cell stack 22 in a quantity sufficient to meet the operational demands placed on fuel cell system 20.

Anode effluent is produced in fuel cell stack 22. The anode effluent includes unused hydrogen and nitrogen that has permeated through the membrane separating the anode and cathode sides. The anode effluent is vented from the anode side of fuel cell stack 22 through a flow path 28 having an automatically controlled bleed valve or similar device 30 therein. Bleed valve 30 can be operable between an open and closed position or, alternatively, can be a proportional valve or device that allows flow path 28 to be opened between zero to 100 percent. Operation of bleed valve 30 is performed by a controller 32, as described below.

Fuel cell system 20 also includes a cell voltage monitor 34 which is operable to monitor the electrical potential or voltage production of individual fuel cells and/or groups of fuel cells in fuel cell stack 22 during operation of the fuel cell stack to ensure that each fuel cell in the stack is operating properly. Specifically, each bipolar plate or group of cells within fuel cell stack 22 is/are electrically coupled to a voltage unit (not shown) that monitors the voltage of each cell/group and the overall output power of fuel cell stack 22. Each group voltage unit includes a plurality of processing modules (not shown) and electrical connectors (not shown) for electrically connecting to the desired bipolar plates in fuel cell stack 22 and provides signals indicative of these voltages as an output to controller 32. Cell voltage monitor 34 can monitor the voltage output of each individual fuel cell, specific individual fuel cells, and/or that of groups of fuel cells, such as every third or fourth cell, along with the total output voltage of fuel cell stack 22. Cell voltage monitor 34 communicates with controller 32 to provide controller 32 with the voltage production of fuel cell stack 22 along with the fuel cells being monitored. Controller 32 uses the voltage output of the fuel cells and fuel cell stack to control and coordinate the venting of anode effluent from fuel cell stack 22, as described below.

Controller 32 operates bleed valve 30 to selectively vent anode effluent from fuel cell stack 22. Controller 32 can be a stand alone controller or can be part of a larger controller that controls and coordinates the operation of fuel cell system 20. Additionally, cell voltage monitor 34 could be included in a single package along with controller 32. Controller 32 receives the cell voltages reported by cell voltage monitor 34 and determines a variance in these voltages. Alternatively, cell voltage monitor 34 could determine the voltage variance and report same to controller 32. The variance can be determined for all of the fuel cells, specific individual fuel cells and/or groups of fuel cells, adjacent or non-adjacent, as desired. Controller 32 can determine the variance in the voltage output in a number of ways. For example, a quadratic difference between the voltage being monitored (individual fuel cells or groups of fuel cells) and an average voltage for similar components (other fuel cells or groups of fuel cells) can be used and/or a quadratic difference between the voltage being monitored (individual fuel cells or group of fuel cells) at one point in time and one or more preceding or subsequent points in time. To determine the venting requirement, controller 32 utilizes a correlation between the voltage variance and the nitrogen concentration within the anode side of fuel cell stack 22. The correlation provides an indirect indication of the level of nitrogen within the anode side. Based on this correlation, a venting requirement is developed to prevent fouling of the anode side of the fuel cell stack with nitrogen, thereby ensuring stable operation. Different fuel cells and fuel cell stacks may have differing sensitivities or tolerances for nitrogen before fouling occurs. Furthermore, this sensitivity or tolerance may change over time. The venting requirement can take these changes into account to a certain degree due to the use of voltage variance. Controller 32 can also utilize other operating parameters in determining the required venting of anode effluent from fuel cell stack 22. For example, controller 32 can utilize the current density (current divided by the active area) of the fuel cell stack and/or the power demand placed on the fuel cell stack when determining the required bleeding of anode effluent, as discussed in more detail below. Controller 32 also monitors the operational conditions of fuel cell system 20 so that the venting of anode effluent is coordinated, as needed, with the overall operation of fuel cell system 20.

Controller 32 can utilize a variety of control strategies to accomplish the selective venting of anode effluent from fuel cell stack 22 based upon the correlation between the nitrogen concentration and the variance in the voltage output. For example, in a first control strategy, controller 32 utilizes a two set point strategy wherein when the variance exceeds a first set point value, a determination is made that bleeding of anode effluent is required. Controller 32, at the appropriate time, will then cause bleeding of the anode effluent by operation of bleed valve 30. When the voltage variance has diminished below a second set point value, a determination is made that bleeding of anode effluent is no longer required. Controller 32, at the appropriate time, will then cause the venting of anode effluent to cease by operation of bleed valve 30.

Controller 32 can access a look-up table 38 to determine the allowable variance in voltage for the particular operating conditions of fuel cell system 20. For example, controller 32 can use look-up table 38 to determine the two set point values when utilizing the two set point control strategy. These values may be different for different operating conditions of fuel cell system 20, such as current density. The allowable variance in voltage production may increase with increasing current density. Thus, when fuel cell stack 22 is operating in an idle mode (low current density) one group of set points may be used while a different group of set points is used when stack 22 is operating at full power (high current density). Thus, the allowable variance of the voltage may differ for differing operating conditions and controller 32 can access look-up table 38 to determine the appropriate values for the set points to be used by controller 32. The data in look-up table 38 can be based on empirical data from a representative fuel cell system or simulation results. The values in look-up table 38 may accommodate for other operating conditions of fuel cell stack 22, such as changing temperature, changing current density, and changing power demand.

With the set points established, when a determination is made that bleeding of anode effluent is required, the bleeding can be done in a variety of ways that will depend upon the operation of bleed valve 30. When bleed valve 30 is a simple open/closed valve, controller 32 will command bleed valve 30 to open. The opening of bleed valve 30, however, may be delayed based upon coordinating the venting with other operating conditions of fuel cell system 20. Thus, when the appropriate time arises, bleed valve 30 will open and the venting of anode effluent will commence. When the voltage variance drops below the second set point value, controller 32 will, when the appropriate time arises, command bleed valve 30 to close and the venting of anode effluent will cease. If the allowable window for venting anode effluent ends prior to the second set point condition being satisfied, bleed valve 30 will again be opened at the next available opportunity to continue the venting of anode effluent until the second set point condition is reached. When bleed valve 30 is a proportional valve, look-up table 38 can also provide a desired proportion for opening bleed valve 30 in addition to the two set points. The controller 32 then will command bleed valve 30 to open the determined proportion when the first set point condition is achieved and command bleed valve 30 to close when the second set point condition is achieved. Again, the opening and closing of bleed valve 30 will be coordinated with the operation of fuel cell system 20. Furthermore, controller 32 could control operation of fuel cell system 20 so that a desired pressure differential across bleed valve 30 occurs prior to venting to provide a desired venting flow rate.

In a second control strategy, controller 32 uses a proportional control scheme (P control scheme) to determine the venting requirements of the anode effluent. For example, when the variance in the voltage exceeds a predetermined value (either fixed or from look-up table 38), controller 32 will determine that anode venting is required. Controller 32, at the appropriate time, will then cause anode effluent to be vented by operation of bleed valve 30. The farther away the voltage variance is from the predetermined valve, the more anode effluent that will be vented. When bleed valve 30 is a simple open/closed valve, the control strategy will establish the time duration for which bleed valve 30 should be open to meet the venting requirements. When bleed valve 30 is a proportional valve, controller 32 will determine the proportion to open bleed valve 30 for the allowed time duration (time available for venting anode effluent without compromising range/efficiency and/or durability of fuel cell system 20) for venting anode effluent. The farther away the variance is from the predetermined valve, the longer the duration bleed valve 30 will be opened and/or the larger proportion bleed valve 30 will be opened. Again, controller 32 can also control operation of fuel cell system 20 so that a desired pressure differential across bleed valve 30 occurs prior to venting to provide a desired venting flow rate.

In a third control strategy, controller 32 uses a proportional integral control scheme (a PI control scheme). When a PI control scheme is utilized, the integrative term (I) accounts for a deviation or offset of the predetermined allowable variance and moves the start point (either time duration of bleed valve 30 being open or the proportional opening of bleed valve 30) accordingly. Again, look-up table 38 can be utilized to provide the predetermined value. Furthermore, the integrative term can be a fixed term or it can be variable and determined by accessing look-up table 38. The operation of bleed valve 30 will then be controlled by controller 32 in the same way as discussed above with reference to the P control scheme with the addition of the integrative term.

Thus, regardless of the control strategy implemented by controller 32, the venting of anode effluent may be different based upon the type of bleed valve 30 employed. When bleed valve 30 is a simple open or closed valve then controller 32 may determine the appropriate time duration for having bleed valve 30 remain in the open position to provide the desired venting of anode effluent from fuel cell stack 22. Alternatively, when bleed valve 30 is a proportional valve, controller 32 may determine the proportion that bleed valve 30 should be opened for a given or fixed duration of time available to vent the required quantity of anode reactant from fuel cell stack 22. Furthermore, when a proportional bleed valve 30 is utilized, the control strategy may determine both the proportion for opening bleed valve 30 along with the duration of time for maintaining that level of opening of bleed valve 30.

Additionally, regardless of the control strategy implemented by controller 32, the venting of anode effluent may be different based upon whether or not a continuous venting of anode effluent is desired. That is, in some fuel cell systems it may be desired to provide a continuous venting of anode effluent from fuel cell stack 22 during its operation. When continuous venting is desired, bleed valve 30 will be a proportional valve so that a small quantity of anode effluent can be continuously vented during operation. Controller 32 will then coordinate the venting of larger quantities of anode effluent as needed based upon the determined venting requirements. The venting of the anode effluent at a greater rate will also be coordinated with the operation of the fuel cell stack to avoid compromising range/efficiency and/or durability.

Moreover, regardless of the control strategy utilized, controller 32 preferably determines the required venting of anode effluent from fuel cell stack 22 so that the nitrogen concentration is at a low enough level that fuel cell stack 22 is prepared to meet an up transient in the power demand placed upon fuel cell stack 22 without nitrogen fouling occurring. By maintaining the nitrogen fraction at a low level, the worst case scenario of the power demand on fuel cell stack 22 going from an idling situation to a full capacity situation can be met without the voltage production becoming unstable.

Referring now to FIG. 2, operation of fuel cell system 20 according to the present invention is illustrated. When it is desired to operate fuel cell system 20, anode and cathode reactant are supplied in the required quantities to fuel cell stack 22 and fuel cell stack 22 begins to produce a voltage output, as indicated in block 70. During operation of fuel cell stack 22, cell voltage monitor 34 monitors the voltage production of select fuel cells of fuel cell stack 22, as indicated in block 72. Cell voltage monitor 34 can monitor the voltage production of each fuel cell of fuel cell stack 22, specific individual fuel cells and/or groups of fuel cells. The voltage production of the select fuel cells is communicated to controller 32. Controller 32 then determines the variance in the voltage production, as indicated in block 74. Based upon this variance, controller 32 determines the venting requirement for the anode effluent to avoid fouling fuel cell stack 22, as indicated in block 76. Controller 32 utilizes one of the control strategies discussed above to determine the anode effluent venting requirement. With the venting requirement determined, controller 32 then selectively vents anode effluent from fuel cell stack 22 to meet the determined venting requirement, as indicated in block 78. The venting of anode effluent may be for a fixed duration of time and/or at a fixed or variable portion of the capacity of bleed valve 30, as discussed above. Controller 32 monitors whether fuel cell stack 22 is operating. If fuel cell stack 22 is operating, then the process disclosed in blocks 72-78 continues to occur, as indicated by decision block 80. Once it is determined that fuel cell stack 22 is no longer operating, the use of the variance in the voltage production to determine the venting requirement of anode effluent from fuel cell stack 22 ends, as indicated in block 82. While the present control strategy does not contemplate the venting requirements while shutting down the operation of fuel cell stack 22, it should be appreciated that anode effluent will be vented from fuel cell stack 22 in an appropriate manner during the shutting down of the operation of fuel cell stack 22. Furthermore, it should be appreciated that cell voltage variance can also be used in controlling or supporting the startup of fuel cell stack 22. For example, a stable voltage variance, once established, can be used as a startup finished indicator.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of operating a fuel cell system having at least one fuel cell stack with an anode flow path having a bleed device downstream of an active area of the fuel cell stack, the method comprising:
   (a) operating the fuel cell stack to produce a voltage output;
   (b) determining a variance in a voltage output of at least one fuel cell of the fuel cell stack; and
   (c) venting anode effluent from the anode flow path based upon a correlation between said variance and nitrogen fouling of said at least one fuel cell of the fuel cell stack, wherein (c) includes venting said anode effluent for a predetermined period of time based upon said variance.

2. The method of claim 1, wherein the bleed device is operable between open and closed positions and (c) includes moving the bleed device to said open position for said predetermined period of time.

3. A method of operating a fuel cell system having at least one fuel cell stack with an anode flow path having a bleed device downstream of an active area of the fuel cell stack, the method comprising:
   (a) operating the fuel cell stack to produce a voltage output;
   (b) determining a variance in a voltage output of at least one fuel cell of the fuel cell stack; and
   (c) venting anode effluent from the anode flow path based upon a correlation between said variance and nitrogen fouling of said at least one fuel cell of the fuel cell stack.

4. The method of claim 3, wherein (c) includes comparing said variance to a predetermined standard indicative of nitrogen fouling in the fuel cell stack and venting said anode effluent based upon said comparison.

5. The method of claim 3, wherein (c) includes using a proportional controller and said variance to determine a venting requirement of the anode flow path of the fuel cell stack to avoid nitrogen fouling of the fuel cell stack.

6. The method of claim 3, wherein (c) includes using a PI controller and said variance to determine a venting requirement of the anode flow path of the fuel cell stack to avoid nitrogen fouling of the fuel cell stack.

7. The method of claim 3, wherein the bleed device is a proportional device and (c) includes opening the bleed device in proportion to said variance to vent said anode effluent from the anode flow path.

8. The method of claim 3, wherein (c) includes using a controller having at least two set points, venting said anode effluent when said variance exceeds a first of said set points and ceasing to vent said anode effluent when said variance is below a second of said set points.

9. The method of claim 3, wherein (b) includes determining a variance in a voltage output of a group of fuel cells of the fuel cell stack and (c) includes venting anode effluent from the anode flow path based upon a correlation between said variance and nitrogen fouling of said group of fuel cells of the fuel cell stack.

10. The method of claim 3, wherein (b) includes determining a quadratic variance in a voltage output of at least one fuel cell of the fuel cell stack.

11. The method of claim 3, wherein (c) includes continuously venting a portion of said anode effluent and adjusting said venting of said anode effluent based upon said correlation.

12. The method of claim 3, wherein (b) includes determining a variance in a voltage output of said at least one fuel cell at two or more different points in time.

13. The method of claim 3, wherein (b) includes determining a variance in a voltage output between at least two fuel cells of the fuel cell stack by comparing the voltage output of a first fuel cell and at least a second fuel cell at substantially a same point in time.

14. The method of claim 3, wherein (c) includes creating a pressure differential of at least a predetermined magnitude across the bleed device prior to venting anode effluent.

15. A method of operating a fuel cell stack to avoid nitrogen fouling, the method comprising:
   (a) operating the fuel cell stack to produce a voltage output;
   (b) determining a variance in a voltage output of a plurality of fuel cells of the fuel cell stack during operation of the fuel cell stack;
   (c) determining a venting requirement for the fuel cell stack to avoid nitrogen fouling of the fuel cell stack based upon a correlation between said variance and nitrogen fouling of the fuel cell stack; and
   (d) selectively venting anode effluent from the fuel cell stack to meet said determined venting requirement.

16. The method of claim 15, wherein (c) includes comparing said variance to a predetermined standard and determining said venting requirement based upon said comparison.

17. The method of claim 16, wherein (c) includes determining a time duration to vent said anode effluent and (d) includes venting said anode effluent for said time duration.

18. The method of claim 16, wherein (c) includes comparing said variance to first and second set points and (d) includes venting said anode effluent when said variance exceeds said first set point and ceasing to vent said anode effluent when said variance is below said second set point.

19. The method of claim 15, wherein (d) includes continuously venting a portion of said anode effluent and adjusting a rate of venting said anode effluent based upon said determined venting requirement.

20. The method of claim 15, wherein (b) includes determining a variance in a voltage output of said plurality of fuel cells at two or more different points in time.

21. The method of claim 15, wherein (b) includes determining a variance in a voltage output of said plurality of fuel cells by comparing the voltage output of a first fuel cell and at least a second fuel cell of said plurality of fuel cells at substantially a same point in time.

22. The method of claim 15, wherein (d) includes creating a pressure differential of at least a predetermined magnitude across a bleed device prior to venting anode effluent.

* * * * *